United States Patent
Mallon et al.

(10) Patent No.: US 7,761,355 B2
(45) Date of Patent: Jul. 20, 2010

(54) COMPUTER APPARATUS AND METHOD FOR PERFORMING FINANCIAL TRANSACTION PROCESSING

(75) Inventors: Guy Mallon, North Yorkshire (GB); Anna Lisa Tazartes, London (GB); David James, Great Missenden (GB); Kunal Malani, London (GB); Donata Calefato, London (GB); Rajesh Gupta, London (GB)

(73) Assignee: General Electric Company, Schenectady, NY (US)

( * ) Notice: Subject to any disclaimer, the term of this patent is extended or adjusted under 35 U.S.C. 154(b) by 281 days.

(21) Appl. No.: 11/750,535

(22) Filed: May 18, 2007

(65) Prior Publication Data

US 2008/0288296 A1    Nov. 20, 2008

(51) Int. Cl.
G06Q 40/00    (2006.01)
G07B 17/00    (2006.01)
(52) U.S. Cl. .............................. 705/35; 705/30; 705/38
(58) Field of Classification Search .................. 705/35, 705/30, 38
See application file for complete search history.

(56) References Cited

U.S. PATENT DOCUMENTS

| 5,920,848 | A  | * | 7/1999  | Schutzer et al. ............... 705/42 |
| 6,315,196 | B1 | * | 11/2001 | Bachman .................... 235/380 |
| 2002/0019791 | A1 | * | 2/2002 | Goss et al. .................... 705/36 |
| 2005/0289044 | A1 |   | 12/2005 | Breslin et al. |
| 2006/0020539 | A1 |   | 1/2006  | Salter |

OTHER PUBLICATIONS

Treaster, Joseph B. "Who Will Profit by Covering the Cards?". The New York Times. New York, N.Y.: Mar 1, 1998. p. 3.12 (3 pages).*

* cited by examiner

*Primary Examiner*—James P Trammell
*Assistant Examiner*—Elda Milef
(74) *Attorney, Agent, or Firm*—GE Global Patent Operation

(57) ABSTRACT

A computer apparatus for performing financial transaction processing on a plurality of accounts is disclosed. The computer apparatus comprises a data storage device having a plurality of account files, each account file storing data relating to a particular account; a data processor for processing data relating to the account files; an input for receiving data relating to the account files and an output for outputting data relating to the account files. The input is arranged to receive data relating to debits and credits for particular account files which are processed by the data processor and stored in the corresponding account files on the data storage device. The data processor is arranged such that an account holder may have the file for their account on the data storage device marked with an indicator for activation of assistance when the account holder for that particular account file has committed expenditure which is greater than income.

18 Claims, 5 Drawing Sheets

COMPUTER APPARATUS AND METHOD FOR PERFORMING FINANCIAL TRANSACTION PROCESSING

The present invention generally relates to a computer apparatus for performing financial transaction processing on a plurality of accounts, in particular to a computer apparatus that is arranged to protect an account holder from not being able to repay their account.

An account holder often has a number of accounts into which they regularly make payments. For example, when opening a store card account, a credit card account or a loan, the account holder commits themselves to making regular payments into those accounts. Many financial services suppliers offer account holders Payment Protection Insurance (PPI) on each of their credit products such as those mentioned above. PPI insures against specific events such as involuntary unemployment or not being able to work for example due to sickness or accidents.

However, the limited set of circumstances in which a valid claim may be made against PPI, generally involving involuntary unemployment, does not provide sufficient protection for many account holders who find themselves unable to meet payments on all of their credit accounts, even if they are employed. Possible situations that may lead to difficulties in meeting payments on all of their accounts include, for example bereavement, divorce, mental health problems and enforced reductions in working hours.

Furthermore, a consumer generally has several different accounts each requiring regular payments, such as one or more store card accounts, one or more credit card accounts and one or more loan accounts for example. In order for the consumer to be able to protect themselves from not being able to repay their accounts they have to set up PPI for each of those accounts. The setting up and regular payment into a plurality of PPI accounts creates a considerable amount of network traffic between, for example the computer systems of the financial institution providing an account holder's bank account, the insurance providers for each of the PPI accounts and the provider of each credit account. Furthermore, there is a considerable technical overhead in the databases associated with each of the computer systems providing the account holder's bank account, the credit accounts and the PPI accounts which each have to store account details and calculate payment amounts and payment details for a large number of credit and PPI accounts for each consumer.

According to a first aspect of the present invention, there is provided a computer apparatus for performing financial transaction processing on a plurality of accounts. The computer apparatus comprises a data storage device having a plurality of account files, each account file storing data relating to a particular account; a data processor for processing data relating to the account files; an input for receiving data relating to the account files and an output for outputting data relating to the account files. The input is arranged to receive data relating to debits and credits for particular account files which are processed by the data processor and stored in the corresponding account files on the data storage device. The data processor is arranged such that an account holder may have their account file on the data storage device marked with an indicator for activation of assistance when the account holder for that particular account file has committed expenditure which is greater than income. The marking may be initiated by the account holder.

The marking of a particular account file with an indicator for activation of assistance when the account holder has committed expenditure which is greater than income, whatever the reason for that may be, provides far more flexible and comprehensive protection than previous PPI arrangements which are only activated in limited circumstances such as involuntary unemployment. An account file on the computer apparatus of the present invention may be marked with an indicator for activation of assistance even when an account holder is still receiving a regular income or is still in employment.

By marking the account file when the committed expenditure exceeds income, appropriate action may be taken to address the situation. The account file may be marked with an indicator for activation of assistance as a result of a successful insurance claim. The marking of an account file on the computer apparatus may initiate, for example the cancellation or repayment of at least a proportion, such as 50%, of an account file's balance on the computer apparatus. The marking of an account file may initiate the interruption of any further debits from the particular account file on the computer apparatus such as debits corresponding to further purchases and/or debits corresponding to interest, charges and further insurance payments. The marking of the account file on the computer apparatus may prompt a financial review for the account holder which may include debt counselling. The outcome of the debt counselling may initiate cancellation or repayment of any remaining proportion of an account balance on the computer apparatus and closing or freezing of the account file on the computer apparatus. Alternatively, if the debt counselling indicates that the account holder's situation has improved such that their committed expenditure no longer exceeds their income, their account on the computer apparatus may be "un-marked" such that it no longer indicates activation of the need for assistance. The account may then be used as before.

As the trigger for marking an account is based on an assessment of a consumer's overall committed expenditure and income, an account holder who previously may have had several separate credit accounts, such as several store cards and several credit cards each with its own PPI, may now be able to have a single account with its more flexible and comprehensive payment protection. The replacement of a plurality of separate credit accounts, each with its own individual PPI, by a single account with more flexible and comprehensive payment protection reduces the technical overhead in the computer systems providing the account holder's bank account, the computer systems providing each previous store card and credit card account and the computer systems providing each previous PPI insurance. This results in a reduction in the storage and processing capacity requirements in each computer system required to keep track of account details and calculate payment amounts and payment dates. Furthermore, the network traffic previously required to communicate regular payments between the computer systems of the account holder's bank, each store card/credit provider's computer system and each PPI provider's computer system is considerably reduced by the use of a single account with more flexible and comprehensive facilities. Moreover, any compatibility problems between the different computer systems is also solved by the present invention.

According to a further aspect of the present invention there is provided a method of operating a computer apparatus for performing financial transaction processing on a plurality of accounts. The computer apparatus comprises a data storage device having a plurality of account files, each account file storing data relating to a particular account; a data processor for processing data relating to the account files; an input for receiving data relating to the account files and an output for outputting data relating to the account files. The method includes receiving data relating to debits and credits for particular account files, processing the received data and storing it in the corresponding account files on the data storage device. An account file on the data storage device is marked with an indicator for activation of assistance when an account holder for that particular account file has committed expenditure which is greater than income.

Embodiments of the present invention will now be described, by way of example only, with reference to the accompanying drawings, in which:

FIG. 1 schematically shows a computer apparatus of an embodiment of the present invention;

FIG. 2 schematically shows the computer apparatus of FIG. 1 connected to a number of external sources of credits and debits;

Figure 1:
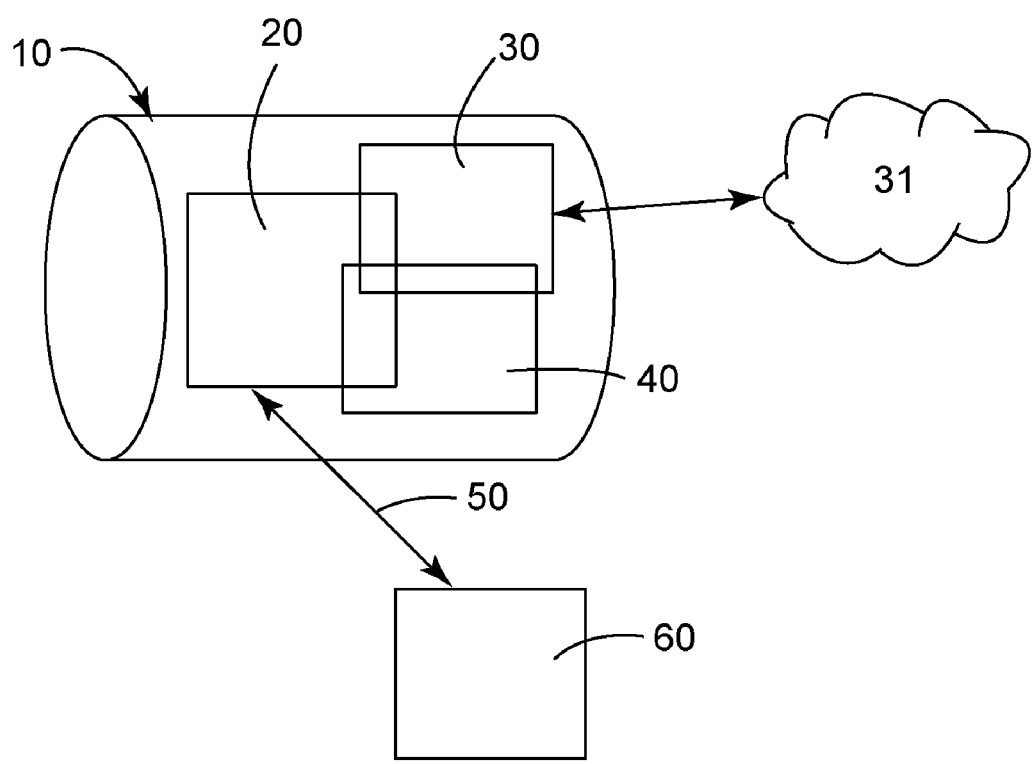

FIG. 1 schematically shows a computer apparatus 10 arranged to perform financial transaction processing on a plurality of accounts. The computer apparatus 10 may process the financial transactions for a particular credit card company for example. The computer apparatus 10 may comprise a main frame computer such as an IBM™ System z9 mainframe or a number of smaller computers networked together as is known in the art. The computer apparatus 10 includes a data processing and storage section 20 which acts as an account handling system. The account handling system generally includes a file for each account. Each file contains data about that account such as the name and address of the account holder, account numbers, date of birth of the account holder, credit limit, a record of insurance associated with the account, etc.

The computer apparatus 10 includes an input/output arrangement 30 to receive transactions, such as the "TRAMS" receivables transaction system as is known in the art. The input/output arrangement 30 is arranged to receive external files over a network 31, a communication link or the like. These external files may be from retailers for example. Retailers typically forward files on a regular basis, such as daily, with details of all transactions by the retailer with account files held by the computer apparatus 10. The input/output arrangement 30 may perform initial processing of the received external files such as to see whether a particular received transaction exceeds an account holder's credit limit and, if so, the input/output arrangement 30 may reject that transaction. The transactions accepted by the input/output arrangement 30 are processed and stored by the data processing and storage section 20, in this example via a system 40, such as a Credit Management System as is known in the art. The system 40 processes data from the input/output arrangement 30 into data for each individual account file held on the data processing and storage section 20. The data processing and storage section 20 processes and stores details of each debit and credit for each account file and keeps a running total of the balance for each account.

As well as processing data received by the input/output arrangement 30 relating to financial transactions, the computer apparatus 10 also generates data for files corresponding to interest, account charges and insurance charges corresponding to each particular account file. The generation of these data will be according to predefined criteria preprogrammed onto the computer apparatus 10 as is well known in the art.

The computer apparatus 10 also includes an output 50. The output 50 may be used to generate statements for each account file. The output 50 may be connected to a suitable printer 60 to prepare the statements which are typically issued monthly. The statements include listing of financial transactions for that month, such as purchases, refunds, insurance charges, interest charges, account charges, etc. The statements are communicated to the account holder, typically by mail or e-mail. An account holder's file may also be viewed by the account holder electronically.

Figure 2:
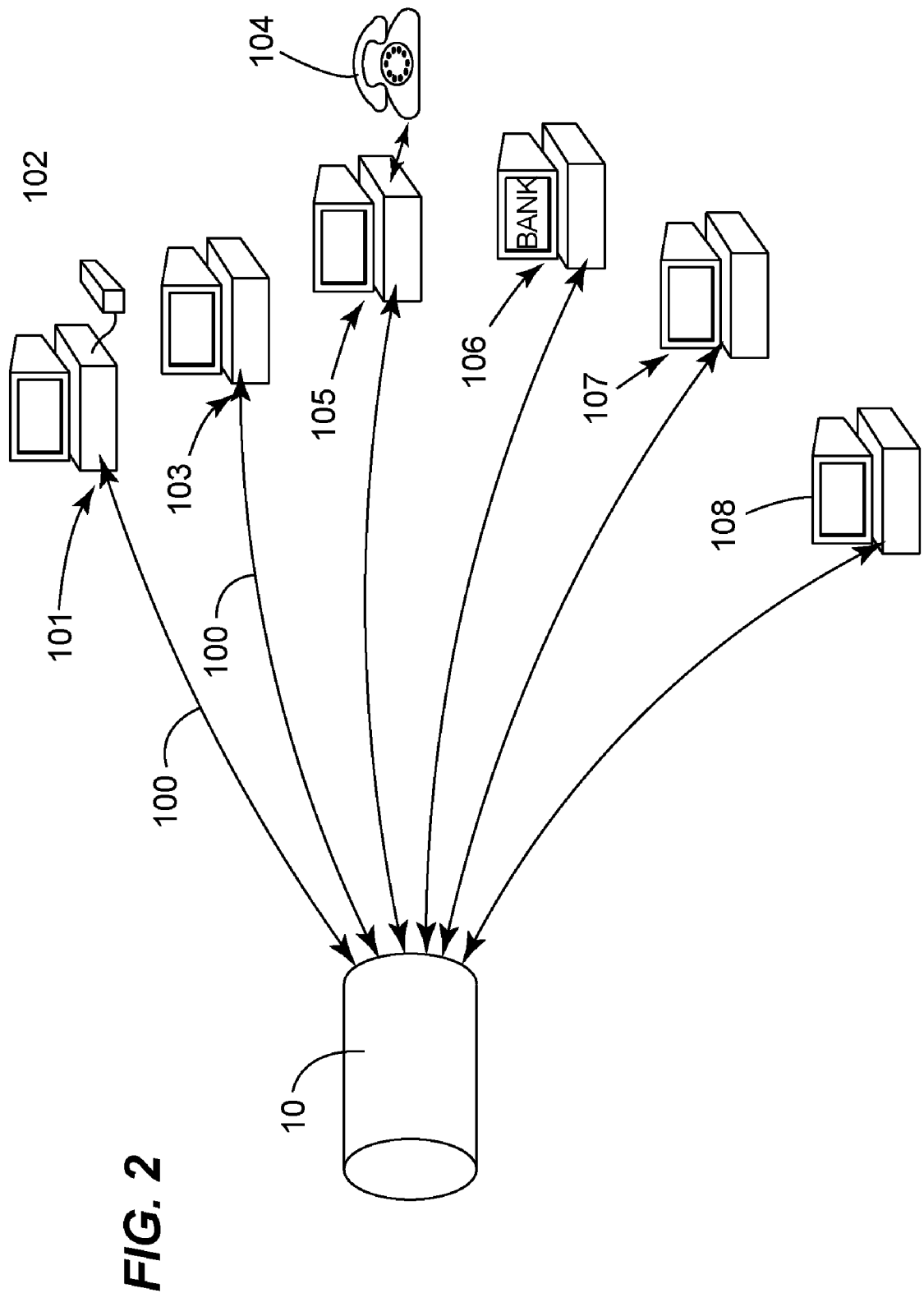

FIG. 2 shows the computer apparatus 10 connected to a number of external sources of debits and credits. Each connection 100 may be over a telephone line, a computer network or the internet for example. The sources of external debits and credits may include retailers with many electronic points of sale 101 with "card swipe" devices 102, on-line retailers 103 such as "Amazon"™, sales conducted via a telephone 104, for example using the touch-tone facility of the telephone or via an operator with a suitable data transmitting device such as a computer 105, banks 106 which process credits and debits and insurance providers 107. Each source of debits and credits 101 to 107 will generally transmit a daily file to the input/output arrangement 30 with the financial transactions from that source for that or the previous day. The debits and credits will then be allocated to the appropriate account files of the corresponding account holder on the data processing and storage section 20 via the Credit Management System 40.

Individual account holders are also able to access the files for their accounts to check balances, review financial transactions, make transfers etc. via their own computer 108 which may also connect to the computer apparatus 10, generally via the website for the credit card company providing the computer apparatus 10. Alternatively an individual account holder may access the files for their accounts via a telephone operator.

Figure 3:
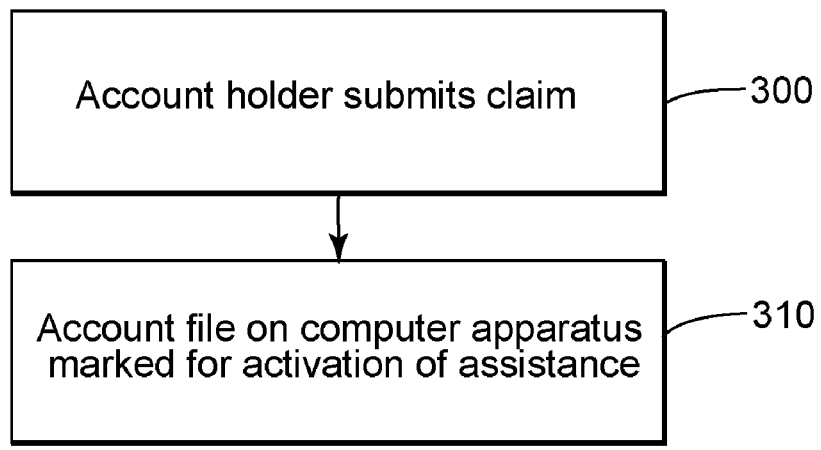
FIG. 3 shows a flow diagram illustrating the operation of a computer apparatus.

FIG. 3 shows a flow diagram illustrating the operation of the computer apparatus as shown in FIGS. 1 and 2 in accordance with an embodiment of the present invention.

At step 300 the account holder contacts the insurance provider 107 or account provider operating the computer apparatus 10 to advise that their committed expenditure is greater than their income. Their claim is typically verified by the insurance provider 107. If the claim is accepted the data processing and storage section 20 of the computer apparatus 10 marks the file for that account with an indicator for activation of assistance as shown in step 310. This assistance may be provided in a number of ways, such as a proportion, such as 50% of the account balance being repaid, interruption of further account charges, interest payment and insurance charges, the provision of access to debt counselling and possibly the repayment of the remaining balance.

Figure 4:
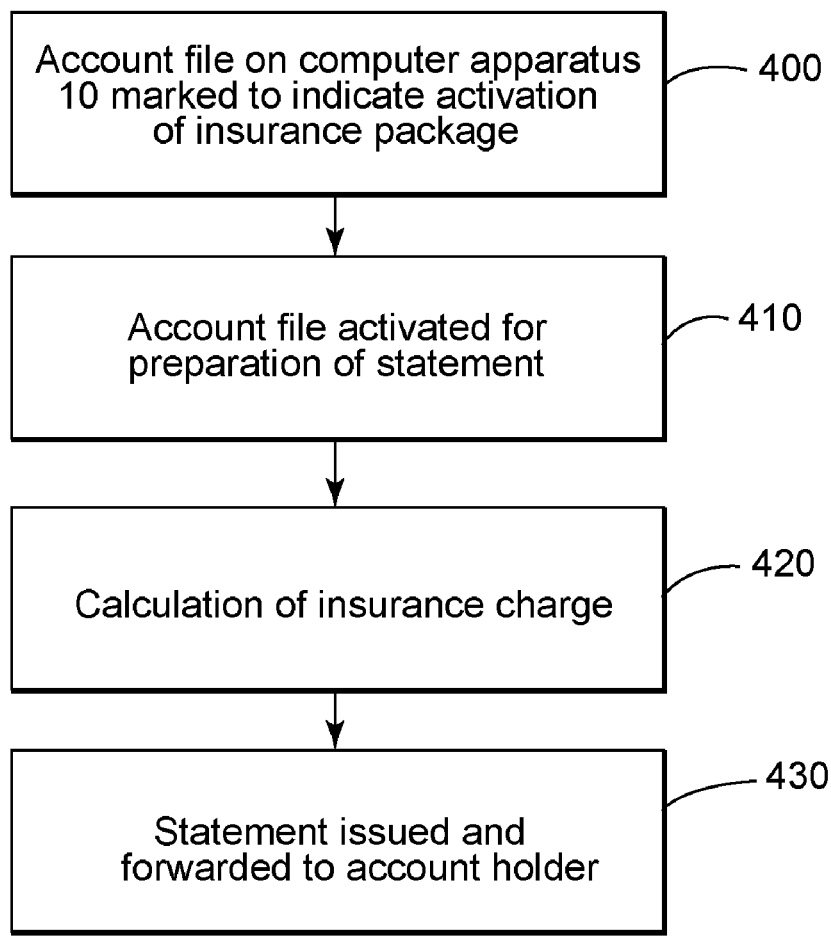
FIG. 4 shows a flow diagram illustrating the setting up of an insurance package.

FIG. 4 shows a flow diagram illustrating the setting up of an insurance package embodying the present invention onto an account. The insurance package may be agreed to by the account holder either upon initial setting up of the account or at any time thereafter. The file for that account on the data processing and storage section 20 is amended in the appropriate field to indicate that the insurance package is activated as shown in step 400. At step 410 on the monthly billing date, the account file is activated for a monthly statement to be prepared. At step 420 the preparation of the monthly statement includes calculation of the monthly insurance charge, which in this example is 1½% of the account balance on the statement date. Of course, any desired insurance charge may be levied at any desirable date. For example the insurance charge could be any desirable percentage of the account balance or any percentage of any other figure such as the credit limit or it may be a fixed charge. The charge could be levied monthly, annually or as a one off charge for example. At step 430 a statement including the insurance charge calculated at step 420 and any other financial transactions and charges incurred during that month is issued and forwarded to the account holder either by mail or by e-mail for example.

Figure 5:
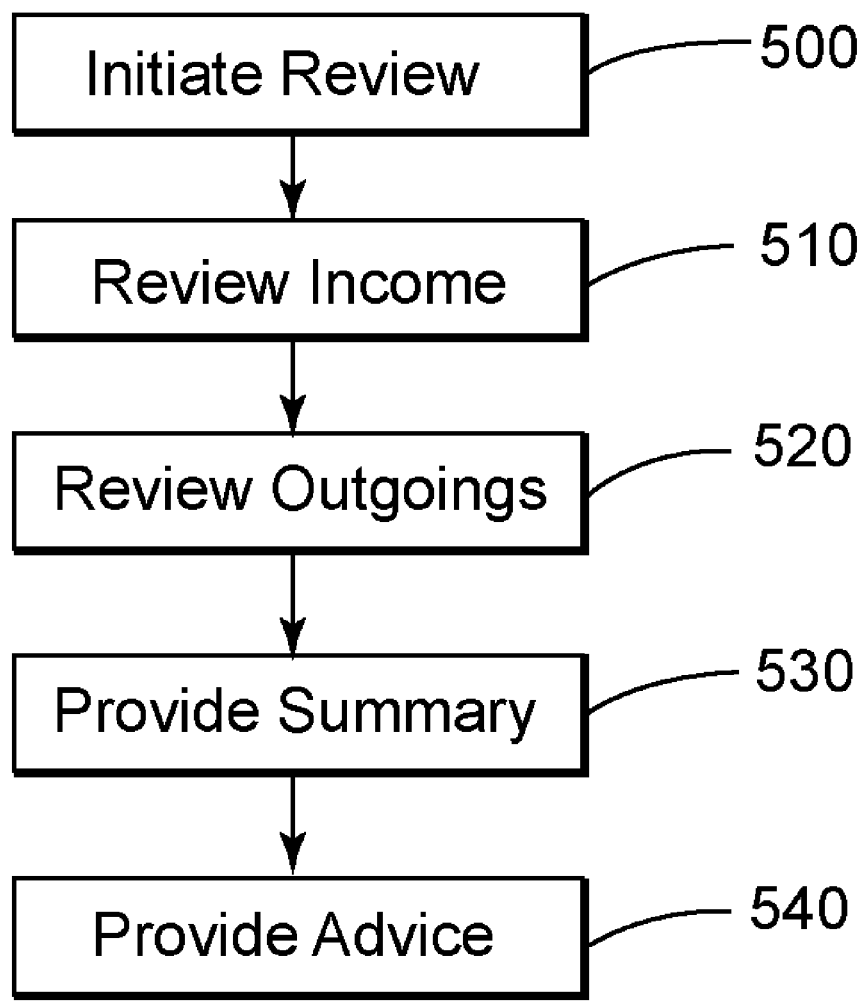
FIG. 5 is a flow diagram of an example of a typical financial review.

At any time whilst the account holder holds the insurance, the account holder may be able to obtain a review of their financial position. This may be provided by the computer apparatus 10 or another computer apparatus by filling in an on-line questionnaire or over the telephone for example. FIG. 5 shows an example of a typical financial review. At step 500 a review is initiated for example by accessing the appropriate package on the computer apparatus 10, or by contacting an adviser over the telephone or in person. At step 510 the account holder provides details of their income such as wages, pension, benefits etc. The account holder may also provide details of any assets such as property, vehicles, shares, savings etc. At step 520 the account holder provides details of their outgoings such as rent, utility bills, loans, car costs, store and credit card balances etc. At step 530, after considering the customer's income and outgoings a summary is provided. Customers are generally found to fall into one of three categories:

customer financially healthy—no or very few financial issues;

customer experiencing some financial issues—advice given;

customer in or approaching financial difficulties.

At step 540 the customer is provided with advice depending upon their situation as determined in the summary of the financial review.

The review as illustrated in FIG. 5 provides useful financial advice to an account holder. This type of service is not conventionally available to many account holders, particularly the less affluent. The review may be provided by a third-party charitable organisation. The account holder may not have to specifically pay for the review which should encourage its use and the review may be undertaken several times if desired.

If an account holder finds themselves in a situation where their overall committed financial expenditure is higher than their monthly income, they may make a claim against the insurance provided by the account. The account holder may become aware of their situation by undertaking a review as illustrated in FIG. 5 or from their own review or assessment of their financial position for example.

Figure 6:
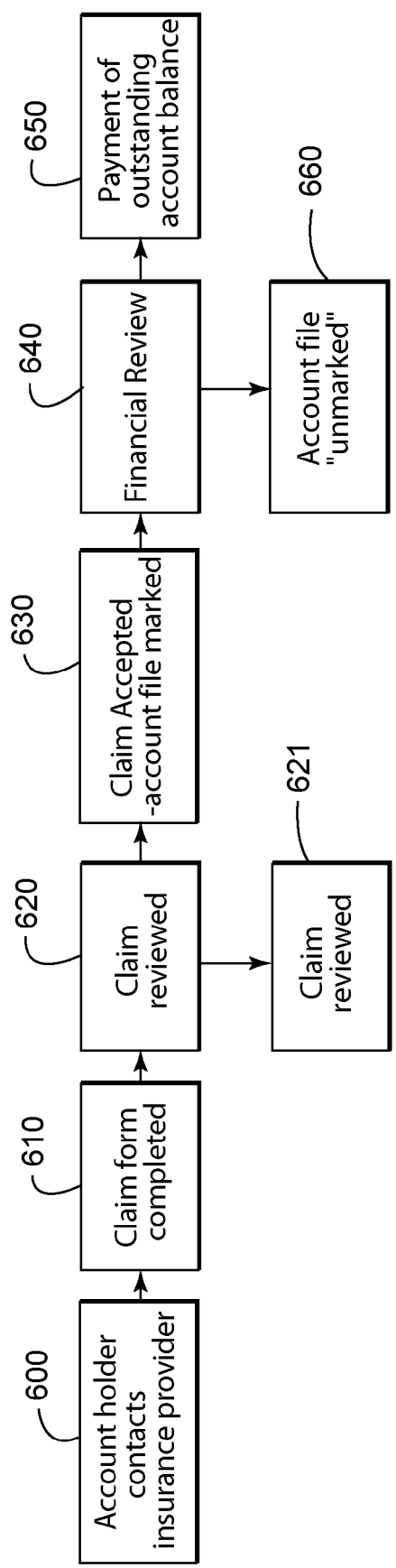
FIG. 6 is a flow diagram showing the steps undertaken when an account holder makes a claim against the insurance provided on their account.

FIG. 6 is a flow diagram showing the steps undertaken when an account holder makes a claim against the insurance provided on their account.

As shown in step 600, an account holder initially contacts the insurance provider. This may be done by accessing the insurance provider's website, possibly via the website of the account provider, which will typically include suitable security features or via the telephone or in person. The account will initially be reviewed to ensure that it is eligible for assistance such as by ensuring that insurance charges have been paid.

At step 610 the account holder completes a claim form providing details of their income and expenditure. The claim form may be completed on-line or may be printed from a website or sent to the account holder and posted back to the insurance provider when completed. The completed claim form may be supported by suitable documents, for example current account statements from the account holder. Examples of completed claim forms may be available to assist the account holder in completing the forms. At step 620 the claim is reviewed by the insurance provider. If the claim is rejected, it is passed to step 621 where the customer is advised accordingly and is provided with the reasons for the decision. The account holder may be provided with advice to help them if they are in a difficult financial position.

If the account holder is confirmed as having committed financial expenditure which is greater than income, typically over a monthly period, the claim is accepted and passed to step 630. There may be many sources of committed expenditure, such as rent, mortgage, utility bills, loans, car costs, store and credit card balances etc. and many sources of income such as wages, pension and benefits.

At step 630 the account holder is advised that their claim has been accepted. The account holder's account is marked in the appropriate field in their account file on the computer apparatus 10 with an indicator that the claim has been accepted for activation of assistance. The account holder's file may be marked in this way for a limited period of time, for example for a maximum of six months. The account is then credited with a proportion of their outstanding balance, typically 50%. However, it may be desirable to credit any other proportion of the balance at this stage such as 60% or 40% for example. The credit is generally initiated by the insurance provider 107 shown in FIG. 2 and passed to the computer apparatus 10 in a daily file from the insurance provider 107. The payment is received by the input/output arrangement 30 and passed to the data processing and storage section 20. Alternatively, the data processing and storage section 20 may initiate the payment of the proportion of the outstanding account balance itself upon confirmation from the insurance provider 107.

The acceptance of the claim also marks the file for that account on the computer apparatus 10 such that no further spending can take place on the account, such that no account charges or interest is levied and such that no further insurance charges are levied. The insurance provider 107 or account provider may be arranged to make periodic and/or regular payments into the marked account to ensure that no adverse references are made to credit reference agencies due to inactivity of the account. The account holder is also advised to undertake a financial review as shown in step 640.

The financial review 640 may be undertaken over the telephone, on-line or in person for example. The financial review may be prompted by the account holder being advised by e-mail or by mail for example by the insurance provider 107 or the account provider to undertake a financial review. Contact details of appropriate bodies that provide suitable financial reviews will be provided to the account holder. Alternatively or additionally, a body providing financial reviews may be provided with the account holder's contact details in order to contact the account holder so that they may be prepared when the account holder contacts them. The financial review is preferably with a recommended debt counselor who is preferably part of a charitable organisation. The financial review 640 would have to be completed within a set period of time, for example six months from the claim being submitted for further assistance to be provided.

If the financial review 640 concludes that the account holder is still in a position such that their overall committed financial expenditure is greater than their income, then the final payment of the remainder of the outstanding balance (typically 50%) is authorised as shown by step 650. Like the payment of the first proportion of the outstanding balance, this is typically paid by the insurance provider 107 in a daily file passed to the account provider's computer apparatus 10.

The account is then "frozen" by being marked accordingly in the appropriate field in the data processing and storage section 20 of the computer apparatus 10 so that the account holder cannot accrue any further debits on the account. After a suitable period of time, for example six to twelve months, the account may be reviewed to see whether the account holder's financial situation has improved such that the account may be "unfrozen" and used in a normal way again. The suitability of the original credit limit will also be reviewed.

The account file on the data processing and storage section 20 of the computer apparatus 10 may be "unmarked" in the appropriate field and the account used normally typically as a result of the financial review 640 concluding that the account holder's financial position has improved as indicated in step 660. In this situation, the payment of the outstanding account balance by the insurance provider 107 is not undertaken, typically because the account holder's financial situation has improved.

The account holder will normally be provided with a limited period of time after the claim is accepted and the initial proportion of the outstanding balance is cleared in which to undertake the financial review 640. This limited period of time may be six months for example. The insurance provider 107 may be arranged to make monthly payments into the account marked with an indicator that a successful insurance claim has been submitted to ensure that no adverse references are made to credit reference agencies due to inactivity of the account prior to the financial review 640 being undertaken.

Many variations may be made to the examples described above whilst still falling within the scope of the present invention. For example, any desired proportion of the account balance may be initially repaid upon a successful claim being submitted. The financial review 640 illustrated in FIG. 6 may be taken earlier or later than six months after initial submission of the claim mentioned in the example above depending upon the account holder's circumstances. Once a claim has been accepted, the account file may be marked such that no further account charges, interest charges or insurance charges are incurred.

The invention claimed is:

1. A computer apparatus for performing financial transaction processing on a plurality of accounts, the computer apparatus comprising:
   a data storage device having a plurality of account files, each account file storing data relating to a particular account;
   a data processor for processing data relating to the account files;
   an input device for receiving data relating to the account files;
   and an output device for outputting data relating to the account files;
   the input device being arranged to receive data relating to debits and credits for particular account files which are processed by the data processor and stored in the corresponding account files on the data storage device; and
   the data processor being arranged such that an account holder has the file for their account on the data storage device marked with an indicator for activation of assistance when the account holder for that particular account file has committed expenditure which is greater than income, wherein the file for an account on the data storage device is marked with an indicator for activation of assistance as a result of a successful insurance claim made when the account holder for that particular account file has committed an expenditure which is greater than income, and wherein the account file on the data storage device that is marked with an indicator for activation of assistance has a portion of a balance of an account repaid.

2. A computer apparatus according to claim 1, wherein the data processor is arranged such than an account holder may have the file for their account on the data storage device marked with an indicator for activation of assistance even while they are employed.

3. A computer apparatus according to claim 1, wherein 50% of the balance of the account is repaid.

4. A computer apparatus according to claim 1, wherein the marking of the account file on the data storage device prevents the data processor from processing any further debits from that particular account file.

5. A computer apparatus according to claim 1, wherein the marked account file is arranged to receive regular payments generated by an account provider or an insurance provider.

6. A computer apparatus according to claim 1, wherein the marking of the account file on the data storage device prompts the arrangement of a financial review for the account holder.

7. A computer apparatus according to claim 6, wherein depending upon the outcome of the financial review the remainder of an outstanding balance on the account file is repaid.

8. A computer apparatus according to claim 7, wherein the account file is marked such that no further debits may be made from the account for a set period of time.

9. A computer apparatus according to claim 6, wherein as a result of the financial review the account file on the data storage device is marked indicating activation of assistance is removed.

10. A method of operating a computer apparatus for performing financial transaction processing on a plurality of accounts, the computer apparatus comprising:
    a data storage device having a plurality of account files, each account file storing data relating to a particular account;
    a data processor for processing data relating to the account files;
    an input device for receiving data relating to the account files; and
    an output device for outputting data relating to the account files;
    the method including receiving data relating to debits and credits for particular account files, processing the received data and storing it in the corresponding account files on the data storage device; and
    marking an account file on the data storage device with an indicator for activation of assistance when an account holder for that particular account file has committed expenditure which is greater than income, wherein the account file on the data storage device is marked with an indicator for activation of assistance following a successful insurance claim made when the account holder for that particular account file has committed an expenditure which is greater than income, and wherein a portion of a balance on the account file is repaid.

11. A method according to claim 10, wherein the account file on the data storage device is marked with an indicator for activation of assistance while the account holder is still employed.

12. A method according to claim 10, wherein 50% of the balance of the account is repaid.

13. A method according to claim 10, wherein once the account file on the data storage device has been marked with an indicator for activation of assistance, no further debits may be made on the account file.

14. A method according to claim 10, wherein the marked account file is arranged to receive regular payments generated by the account provider or an insurance provider.

15. A method according to claim 10, wherein once the account file on the data storage device has been marked with an indicator for activation of assistance the account holder is prompted to undertake a financial review.

16. A method according to claim 15, wherein as a result of the financial review, the remainder of an outstanding balance on the account file is repaid.

17. A method according to claim 16, wherein the account file is marked to indicate that no further debits may be made from the account for a set period of time when a review of the account holder's financial position is to be made.

18. A method according to claim 15, wherein as a result of the financial review the marking of the account file on the data storage device with an indicator for activation of assistance is removed.

* * * * *